United States Patent [19]

Stafford

[11] Patent Number: 5,800,112

[45] Date of Patent: Sep. 1, 1998

[54] LOADING SPOUT HOIST MECHANISM

[75] Inventor: Brian T. Stafford, Selby, Canada

[73] Assignee: Ems-Tech Inc., Belleville, Canada

[21] Appl. No.: 951,449

[22] Filed: Oct. 16, 1997

[51] Int. Cl.⁶ .................................................. B65G 11/10
[52] U.S. Cl. ........................ 414/141.8; 193/25 C; 193/30; 414/143.1; 414/299
[58] Field of Search ............................ 193/25 C, 30; 414/141.8, 143.1, 295, 299, 397

[56] References Cited

U.S. PATENT DOCUMENTS 4,277,214  7/1981  Mahle et al. .................. 414/141.8
5,372,229  12/1994  Leibling ....................... 414/141.8 X

*Primary Examiner*—Janice L. Krizek
*Attorney, Agent, or Firm*—Robert A. Wilkes

[57] ABSTRACT

A loading spout hoist mechanism comprises a multiple monospiral winch drum. The drum is located under the top of the loading spout, and the loading spout passes through it. The multiple monospiral winch drum is supported on two rings, the first of which is located inside the second. The first ring is fixed to the loading spout support frame, and the second ring is journalled to first one. The second ring also carries a ring gear, which may comprise gear teeth machined into the ring, or a separate ring gear attached to the second ring. The loading spout support frame carries a pinion drive mechanism which engages the ring gear, and can rotate the second ring in either direction, to raise and to lower the loading spout by winding in or out the loading spout support cables carried in each monospiral of the winch drum. In a modification, the loading spout is attached to the support frame by motorised pin mechanisms. The loading spout hoist is compact, permits precise movement of the bottom end of the loading spout, and does not interfere with the feed belts used to deliver solids to the loading spout.

18 Claims, 5 Drawing Sheets

LOADING SPOUT HOIST MECHANISM

BACKGROUND OF THE INVENTION

1. Field of the Invention

This invention is concerned with apparatus used in the stacking of bulk particulate materials, such as coal, mineral ores, grain, and the like.

When such particulate materials are transported it is often necessary to transfer them from one form of transport to a bulk holding facility, from such a facility into a form of transport, or from one form of transport to another. Thus, coal for shipment from one country to another will be delivered to a port in rail cars and transferred from the cars to a stack, and the stack will be transferred to the holds of a bulk cargo vessel for shipment elsewhere. In moving such materials about belt conveyors are commonly used to effect substantially horizontal movement. A loading spout, supported by a spout hoist, is used to transfer a flow of particulate material travelling more or less horizontally on a belt conveyor from the conveyor more or less vertically onto a stack, into the hold of a bulk cargo vessel, or into rail cars. The loading spout serves to contain the descending particulate solids in a coherent flow, and to locate the solids onto a developing stack at a desired location.

2. Description of the Prior Art

Several loading spouts of this broad type have been described.

Isojima et al., in U.S. Pat. No. 3,926,290, describes a telescoping loading chute in which separate sections of the telescopic chute include trays which form an internal zigzag ladder structure. When the lower telescoping sections of the chute are retracted by means of a chute hoist, the trays therein are rotated to a vertical position. The trays also deflect the solids descending through the chute into a zigzag path, rather than simply allowing the solids to fall freely down the chute.

Straub, in U.S. Pat. No. 5,286,155, describes a loading spout which includes a weight activated spring loaded chamber, so that a constant flow of material from a belt conveyor is slowed down, and converted to a sequential flow. The spring loaded chamber only releases material when the weight of the contained load is high enough to overcome the springs.

Higashinaka et al., in CA 1,098,849, describes a loading spout which appears to contain at least one winch mechanism adjacent the top of the spout, which is used to raise and lower the spout.

De Ridder, in CA 2,037,368, describes a loading spout in which several winches placed above the top of the spout are used to raise and lower it.

Whilst the known loading spout devices are more or less successful, they suffer from two main disadvantages.

First, in a loading spout the particulate material is not allowed to fall freely, but instead is deflected into a zigzag path, which is defined by the internal shape of the separate units which make up the loading spout. Isojima et al. show one typical construction to achieve this. The nature of the zigzag path is related to the properties of the particulate material, and hence the internal shape of a loading spout defining the zigzag path should be matched to the material being handled. The only way this can be achieved is to change the loading spout. With the known loading spouts it is effectively impossible to do this within any reasonably acceptable time frame. It therefore follows that loading spouts are often used to handle particulate solids for which they were not designed.

Second, when a loading spout is in use, the bottom end of the spout is located near to the top of the stack: as the stack grows it has to be retracted. The elements making up the loading spout are generally supported on cables or the like, and the bottom of the loading spout is raised and lowered by a spout hoist, which is generally a winch mechanism. Due to space constraints at the head of a loading spout, which are particularly important in loading spouts mounted as part of a shiploading boom that can be raised or lowered, the required winch, or winches, have to be located remote from the head of the loading spout, which serves to complicate the cable runs needed for raising and lowering the loading spout, and also makes precise location of the bottom of the spout hoist more difficult.

SUMMARY OF THE INVENTION

This invention seeks to overcome these disadvantages by providing a spout hoist mechanism which is compact and capable of precise movement. In an alternative arrangement, the spout hoist mechanism can be used in conjunction with a loading spout mounting device which permits the assembly of spouts to be readily changed, or removed for repair and maintenance.

Thus in a first broad embodiment this invention seeks to provide a loading spout hoist, for attachment to a loading means including a substantially vertical loading spout, comprising in combination:

- a substantially horizontal loading spout support frame including a central aperture through which the loading spout passes;
- a first circular ring means, supported by the support frame, and located around the outside of the loading spout;
- a second circular ring means journalled onto the first ring means;
- at least one drive means constructed and arranged to rotate the second ring in either direction of rotation about the first ring;
- a winch means carried by the outer ring including at least one monospiral drum;
- a cable means carried by each monospiral drum attached at a first end to the monospiral drum and anchored at a second end to the loading spout; and
- a sheave means constructed and arranged to receive each cable from each monospiral drum in a substantially horizontal direction and to transfer the received cable to the loading spout in a substantially vertical direction.

Preferably, the common axis of the first and second circular rings is substantially concentric with the vertical axis of the loading spout.

Preferably, the second ring is outside the first ring.

Preferably, the second ring is journalled onto the first ring by means of a plurality of rollers occupying cooperating tracks in the first and second rings. More preferably, the second ring is journalled onto the first ring by means of a plurality of rollers occupying a single pair of cooperating tracks.

Preferably, each drive means to rotate the second ring comprises a ring gear carried by the second ring, and a motor drive means including a pinion engaged with the ring gear, a reduction gear box driving the pinion, and a motor driving the gear box.

Preferably, the winch means includes three monospiral drums, each provided with separate cables which pass over separate sheaves, and wherein each cable is attached to the loading spout.

Preferably, each cable is attached to the loading spout adjacent the exit end of the loading spout. Alternatively, each cable passes about a pulley attached to the loading spout adjacent the exit end of the loading spout, and is anchored to the loading spout support frame adjacent the top of the loading spout.

In a second broad embodiment, the loading spout including a spout hoist further includes at least two motorised pin mechanisms for attaching the loading spout to the support frame.

Preferably, each pin motorised mechanism comprises in combination:

a loading spout including a first chute section;

a mounting link including a first mounting pin hole extending upwardly from the first chute section;

a mounting box carried by the support frame, constructed and arranged to receive a mounting link carried by the first chute section;

at least one loading spout carrying link extending upwardly from within the mounting box, including within the mounting box a second mounting pin hole;

a pin means attached to the mounting box including a mounting pin constructed and arranged to fit within the first and second mounting pin holes, attached to a gear box and drive motor whereby the pin is driven into and out of engagement with the first and the second mounting pin holes.

Preferably, each motorised pin mechanism includes two spaced apart loading spout carrying links including second and third mounting pin holes disposed so that the mounting link enters between them, and the mounting pin fits within the first, second and third mounting pin holes.

BRIEF DESCRIPTION OF THE DRAWINGS

In the following description reference will be made to the attached drawings in which.

In these Figures, only the mechanical elements necessary for an understanding of the invention are shown, as the remainder of the structure will be determined by the location where the spout is to be used. For example, the structures required to support the loading spout and hoist shown in FIG. 3 on land to form a stacked stockpile and as part of a ship loader boom will be quite different and are well known in the art.

Figure 1:
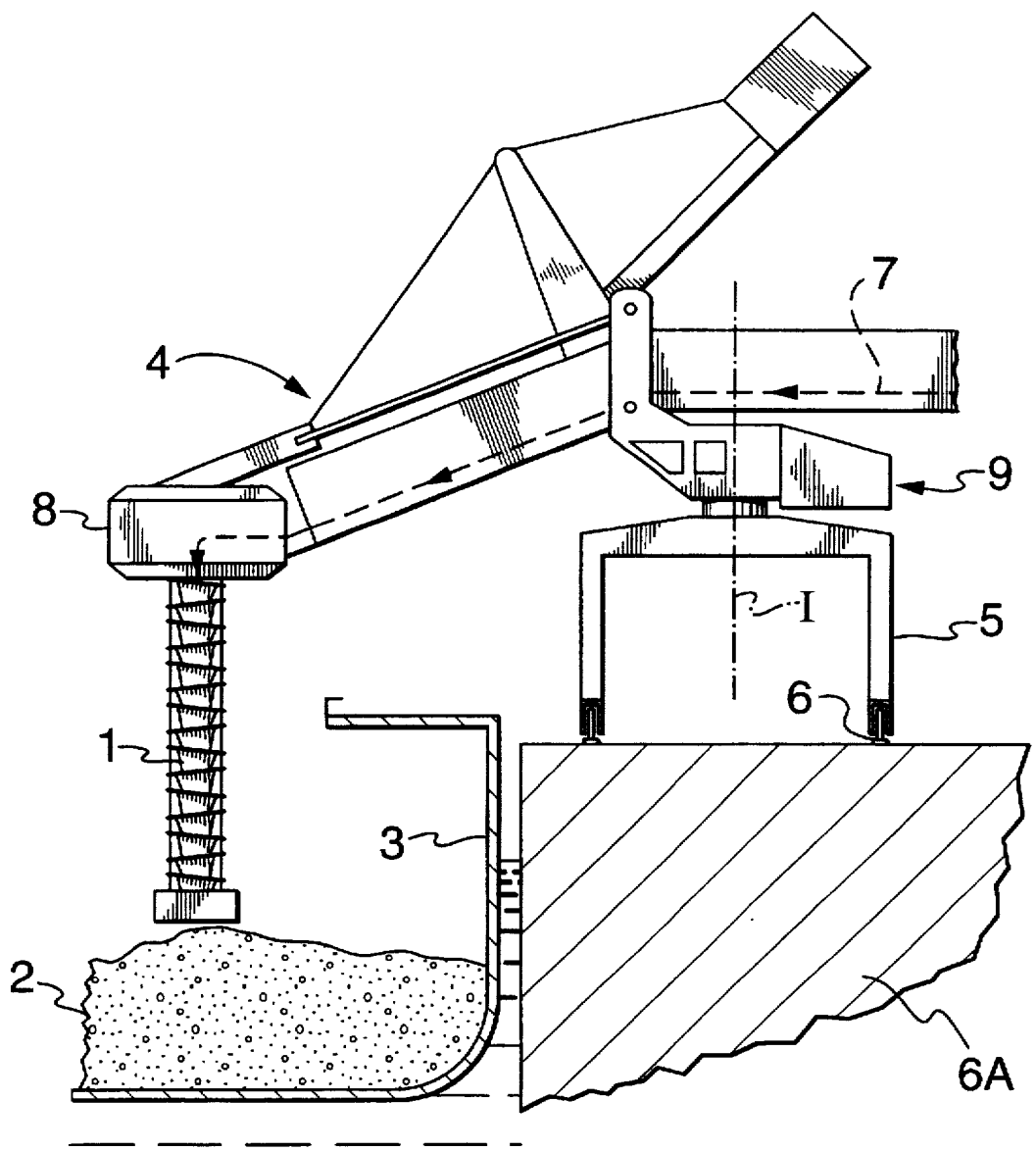
FIG. 1 shows in a partly sectional view a conventional loading spout.

In FIG. 1 is shown a typical loading spout of known design in use to load a bulk cargo ship. The spout 1 is in use to load a particulate soil 2, such as coal, metalliferous ore, fertilizer, grain or the like into a ship's hold 3. The loading spout 1 is supported by a conventional crane boom mechanism 4 providing vertical movement. The boom mechanism is supported by the carriage 5 running on rails 6 on the dockside 6A. The boom mechanism can be rotated about the axis I on the carriage, thus permitting the loading spout to be moved to any desired location in the ship's hold. The particulate material to be loaded is delivered to the loading spout by the conveyor belt system 7, which is incorporated into the boom mechanism 4. The spout is attached to the boom in the boom head 8. The motors and controls for the crane boom are contained in the cabin unit 9. The loading spout is raised and lowered (as is detailed below) by a winch and cable system, the winches for which are in either the boom head 8, or the cabin unit 9.

Figure 2A:
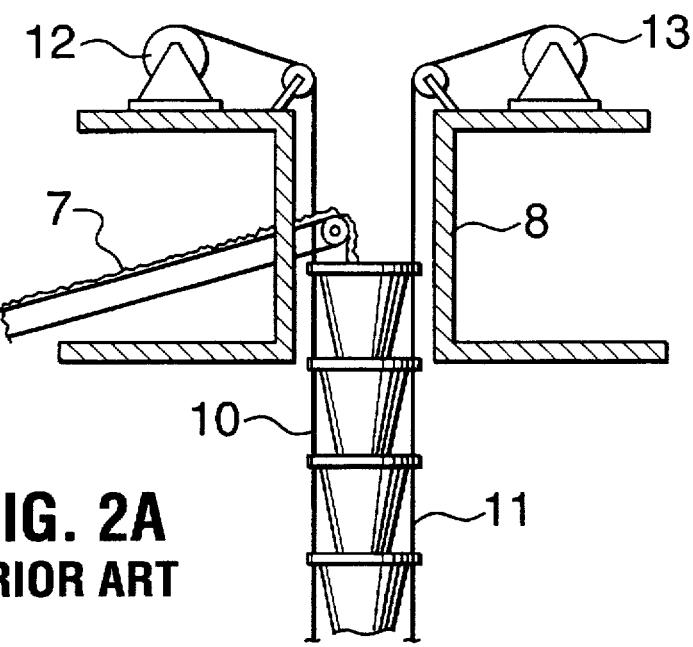
FIGS. 2A and 2B show prior art loading spout hoists.
Figure 2B:
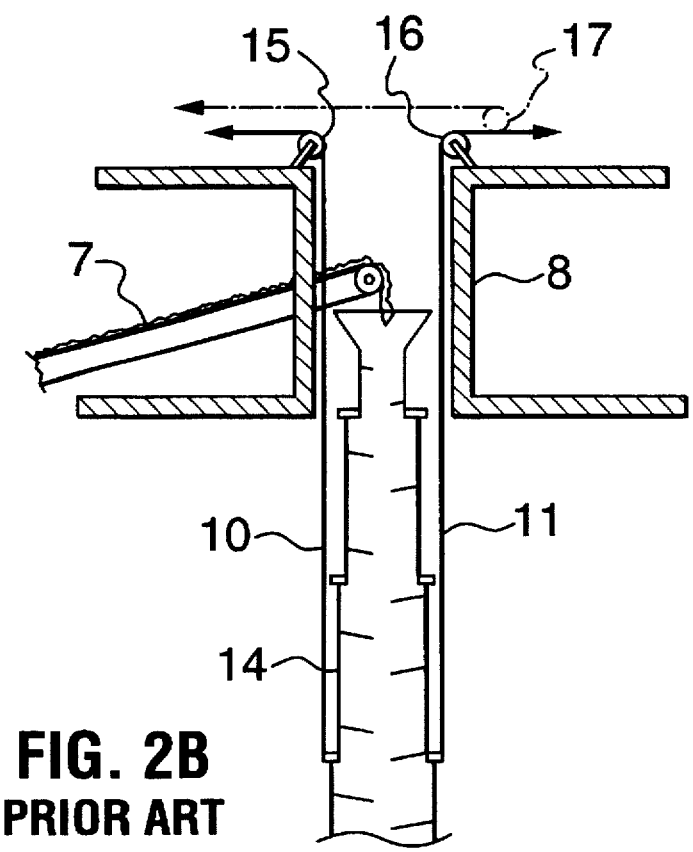

FIGS. 2A and 2B show in a more detailed schematic form two varieties of loading spout hoist mechanism conventionally used in units of the type shown in FIG. 1.

Referring first to FIG. 2A, the loading spout 1 is supported by the boom head 8. Particulate material is fed into the loading spout by the conveyor 7. The loading spout is supported by spout cables 10,11 of which two are shown. Generally more than two cables are used. The cables 10, 11 are attached to the bottom end of the spout at their lower ends, and to the winches 12, 13 at their upper ends. The loading spout is raised and lowered by operating the winches.

In FIG. 2B a similar arrangement is shown in which a loading spout 14 of different construction to that shown in FIG. 2A is supported by a boom head 8 and receives particulate material from the feed belt 7. The lower ends of the loading spout cable 10, 11 are attached to the bottom end of the loading spout, and the upper ends pass over sheaves 15, 16 and are routed to at least one remotely located winch (not shown). Alternatively, further sheaves at 17 can be used, so that all of the cables can be routed to a single winch mechanism.

In these Figures it can also be seen that, in use, the loading spout is in a substantially vertical position.

The disadvantages mentioned above can be seen in both of these typical systems. Since the winches used have relatively small diameter drums, onto which a relatively long length of cable has to be wound, there is a significant change in the cable speed at a constant winch speed as cable accumulates on the drum. This makes accurate placement of the loading spout difficult. As the cylindrical monospiral drum is filled, succeeding turns of cable overlie each other, and consequently a variable high torque is required to lift the loading spout, which in its turn requires a larger drive motor (these winches are normally electrically driven), and the interposition of a high ratio reducing gear between the drum and the motor. Further, whilst not so much a problem with land mounted units, for ship mounted units both weight and space are at a premium, particularly in the boom head. Although the sheaves system in FIG. 2B could be placed below the feed conveyor 7, there is insufficient space in such a location for conventional winches together with their drive motors. Additionally, placement of the winches and motors in the boom head creates a significant geometry problem as the boom is raised and lowered.

Figure 3:
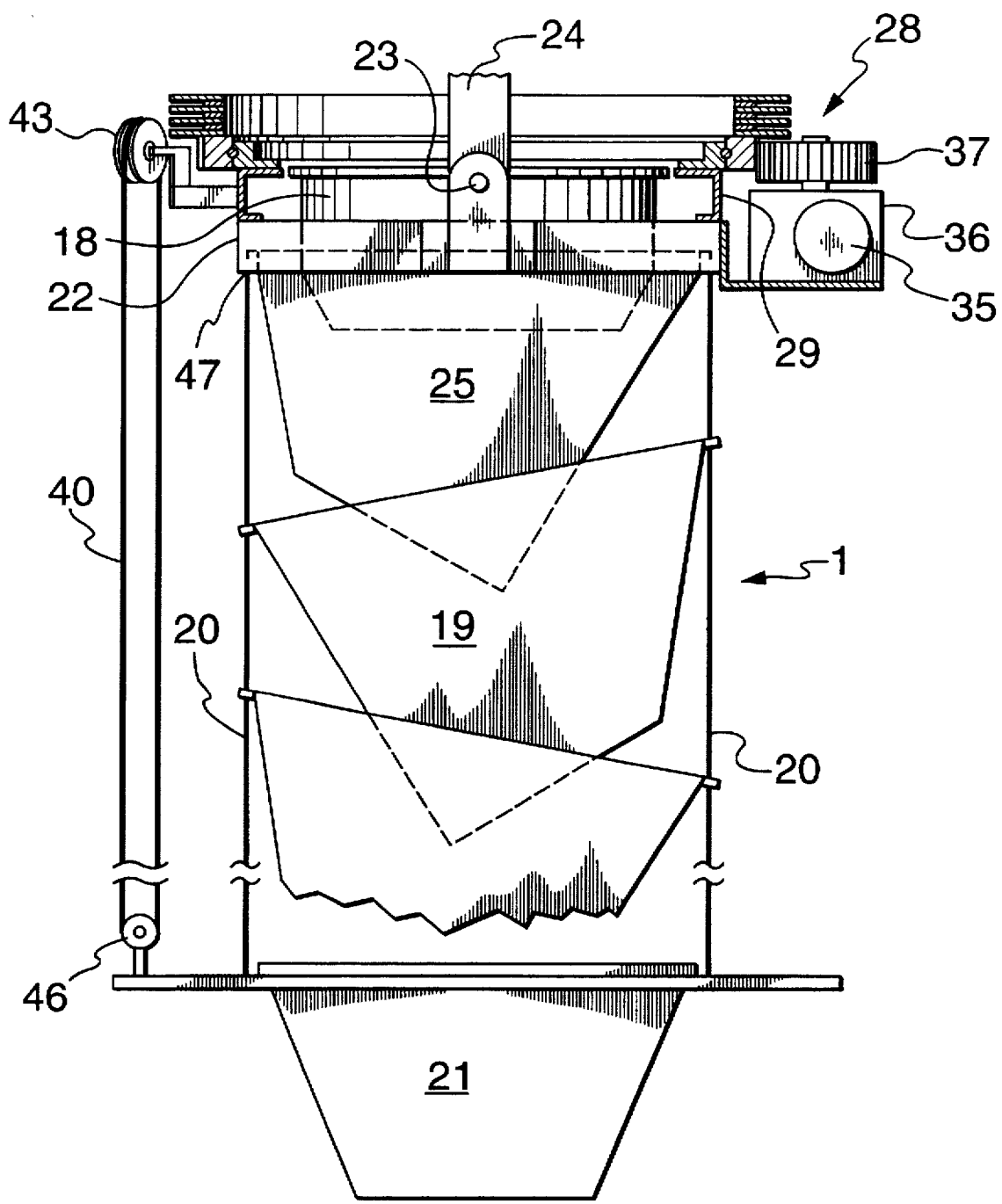
FIG. 3 shows a loading spout incorporating a loading spout hoist according to this invention.
Figure 4:
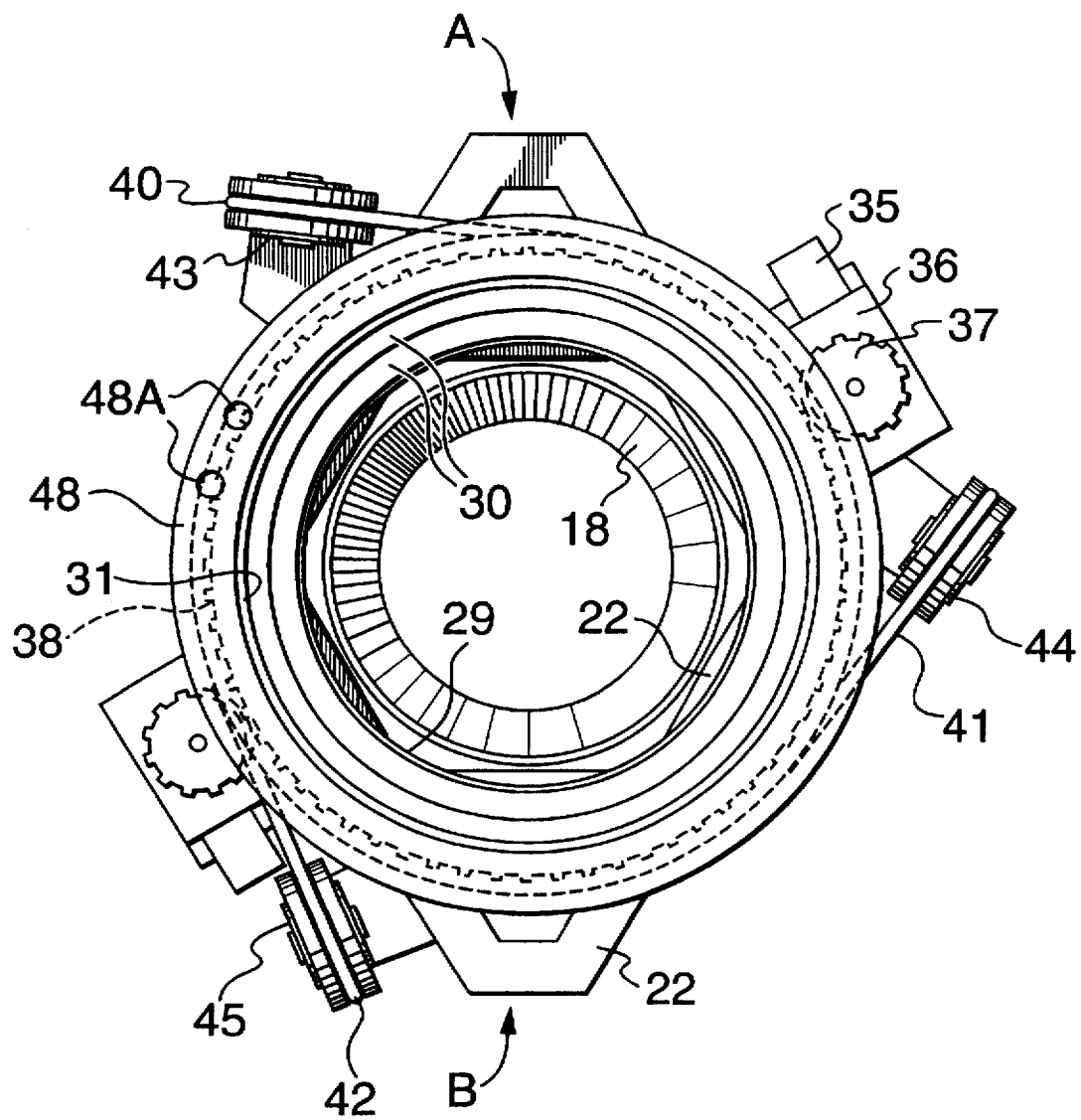
FIG. 4 shows a plan view of the hoist of FIG. 3.
Figure 5:
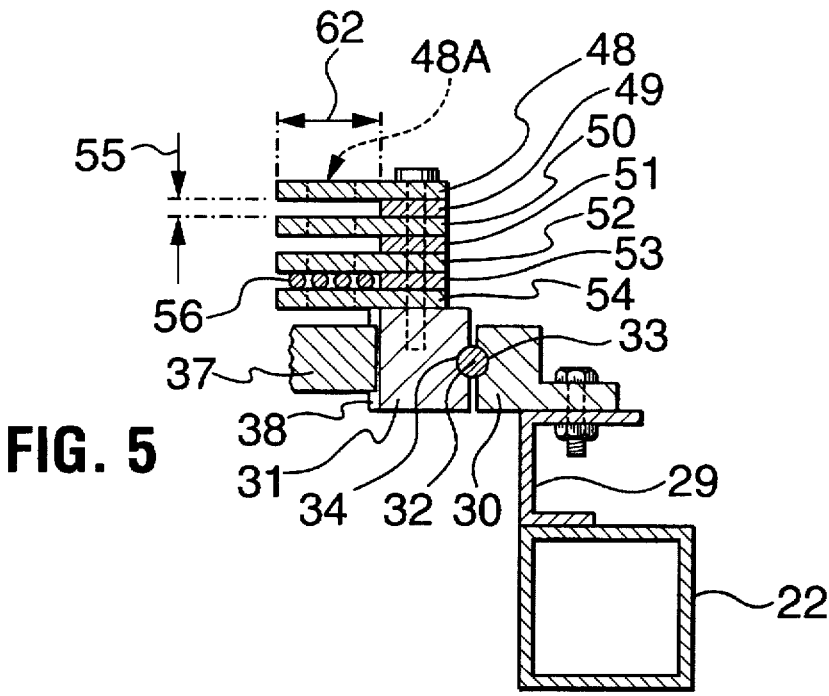
FIG. 5 shows in detail the hoist drum mechanism of FIGS. 3 and 4.

These disadvantages are avoided in the spout hoist mechanism shown in FIGS. 3, 4 and 5. For clarity, the supporting pins and links are omitted from FIG. 4.

As shown in FIGS. 3, 4 and 5, the spout 1 includes a first feed section 18, a plurality of chute sections 19 located by the straps 20, at the bottom of which is an exit section 21. The straps 20 are attached at their top end to the hoist frame 22, and at their bottom end to the exit section 21. With this form of construction, when the loading spout is fully retracted, the chute sections nest into each other thus requiring the minimum of space. The loading spout and the spout hoist are carried by a frame 22 which is attached by a pin 23 to a supporting link 24. The link 24 is supported by the boom head structure (not shown). The first section 25 of the chute is attached to the frame 22 by a removable pin 26.

The spout hoist mechanism comprises a multiple monospiral winch drum means 28, shown partly sectioned, which is located around the loading spout adjacent the feed section 18 and the first chute section 25. The winch 28 is made up of several parts. The winch frame 29, which is attached to the frame 22, supports a first fixed circular ring 30, through which the loading spout 1 passes. Outside the fixed ring is a second rotatable outer ring 31. The second ring is a close fit onto the first ring and is journalled onto it, for example by a set of rollers 32 which run in tracks 33, 34. The second ring is rotated in either direction by a drive means comprising the drive motors 35, acting through reduction gearboxes 36 to drive the pinions 37. The motor-gearbox units are also carried by the support frame 22. The pinions 37 engage a ring gear 38 on the outside of the second ring 31.

Above the second ring and attached to it is a triple monospiral winch drum 39, which carries cables 40, 41, and 42. As can be seen in FIG. 4, each of these cables 40, 41, 42 passes over sheaves 43, 44, 45 supported by the frame 22, and, as can be seen in FIG. 3 for the cable 40, passes around a pulley 46 attached to the exit end 21, and then is anchored at 47 to the frame 22. As the multiple monospiral drum 39 rotates, the cables 40, 41, 42 are wound in or let out thereby raising and lowering the loading spout. It can also be seen that the sheaves 43, 44, 45 serve to receive the cables from each monospiral drum in a substantially horizontal direction, and transfer the cable down to the loading spout in a substantially vertical direction. For the chute shown in FIGS. 3, 4 and 5 a triple monospiral drum is used; depending on the size of the chute more than three support cables can be used, which will require further additional drum sections for each additional cable.

The multiple monospiral drum is shown in more detail in FIG. 5. The winch frame 29 is mounted onto the frame 22. The winch frame supports the fixed first ring 30, to which the second ring is journalled by the rollers 32. The second ring 31 includes a ring gear 38 on its outer face which engages with the pinion 37.

The multiple monospiral drum is attached to the top of the second ring, and, as shown includes three monospiral drums each of which carries a single cable. The multiple drum comprises a sequence of ring plates 48, 50, 52, 54 separated by spacing rings 49, 51 and 53. The thickness as at 55 of the spacing rings is chosen so that the gap between each pair of ring plates is only wide enough to accept one thickness of cable so that in each monospiral drum as shown at 56 successive turns of each cable are wound radially outwardly on top of the preceding one. The width 57 in each monospiral drum is arranged to provide enough room to accommodate the required length of cable. It has also been found advisable to provide spaced holes, as at 48A, in the ring plates, so that any particulate solids which might be spilt do not become trapped between the cable turns on the monospiral drum.

This construction has several advantages in comparison with the prior art structures. It is compact, and takes up the minimum of space in the boom head or equivalent structure, and yet leaves a completely clear large center opening for the loading spout. It is positioned below both the top of the loading spout and the end of the particulate solids feed devices, and thus does not interfere with either of them. Although as the monospiral drum turns the effective radius changes, the amount of change, and therefore the amount of change in driving torque, is minimal. In a loading spout hoist of this type the multiple monospiral drum will generally be of 6 feet or more diameter, so that one complete turn of the monospiral drum will move the exit end of the loading spout by nearly 10 feet, and the torque will vary by an amount proportional the diameter of the supporting cable. As this will commonly be of the order of * inch, the torque variation is less than 1.5% per full rotation for a monospiral drum having a diameter of about 6 feet, and proportionately lower for larger diameter monospiral drums.

Figure 6:
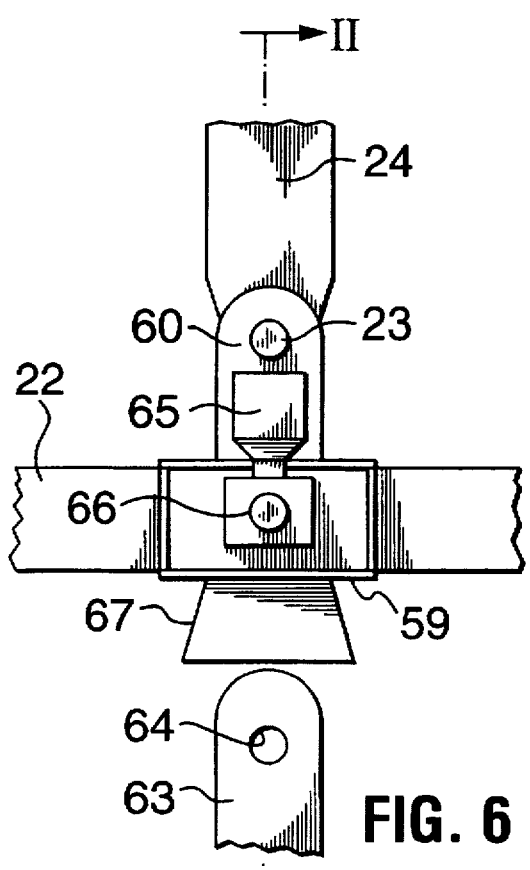
FIGS. 6 and 7 show an automated locking device for attaching the spout to the spout hoist of FIGS. 3, 4 and 5.
Figure 7:
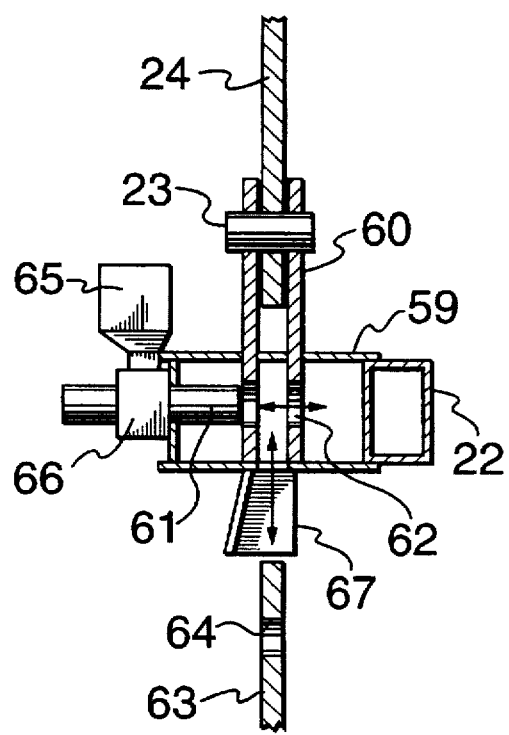

A further feature of this invention is shown in FIGS. 6 and 7, in which FIG. 7 is a partial cross section on the line II in FIG. 6. The compact spout hoist of this invention makes it possible to readily install and detach a loading spout. Rather than using a simple pin as shown in FIG. 3, as shown in these two Figures the frame 22 is still attached by the pin 23 to the supporting link 24. A support box 59 is attached to the frame 22 (conveniently at the locations A, B in FIG. 4) to which are attached the loading spout carrying links 60. A motorised pin 61 fits into the apertures 62 in the links 60. The anchor link 63, attached to the first chute section includes a matching aperture 64. The position of the pin 61 is controlled by the motor 65 and screw jack 66.

To attach a loading spout the frame 22 is lowered over the top of the spout, and the cable pulleys, eg 46, attached to the exit section 21. The loading spout hoist is then used to raise the loading spout so that the mounting links pass through the guidebox 67 and into the slot between the links 60. The motor 65 is then used to push pin 61 into engagement with both the links 60 and the anchor link 63.

A number of modifications can be made to the structures described above. The rollers between the first and second ring need not be spherical, and could be cylindrical. If desired, more than one row could also be used. Alternatively, the second ring can be placed above the first ring, with either rollers or wheels between them. The second ring could also be placed inside the first ring, but this will complicate hoist construction. As shown, the drive to the second ring is by gear teeth cut directly into the outside face of the ring: a separate ring gear could be used, typically made in sections and attached to the outside of the outer ring. Similarly, the engagement between the pinion and the gear ring could be placed on the lower face of the second ring. As a further alternative, the ring gear and pinion drive could be replaced by a chain drive. Although three drive motors are shown, either more than or less than three can be used. If fewer motor units are used they will need to be more powerful, and therefore larger motors and gearboxes will be needed. It is also possible to omit the pulley located on the exit unit, but again since this results in the loss of the mechanical advantage of the pulley, this will double the line pull and the gear reduction ratio required for the winch drive motors. Finally, as shown in FIG. 3 the chute sections provide a cascade zigzag path. Other chute sections, such as both simple conical sections and straight tubular sections can also be used with the spout hoist of this invention.

There is one feature of the invention which is desirable, as it provides a significant level of safety without requiring any independent brake mechanisms. This is the possibility to use a worm gear reduction gear box to drive the pinions. In addition to providing a high reduction ratio in a relatively small space, such a gear train can only rotate when the motor rotates, so that if a drive motor should fail, the loading spout cannot fall to its full length.

What is claimed is:

1. A loading spout hoist, for attachment to a loading means including a substantially vertical loading spout, comprising in combination:

a substantially horizontal loading spout support frame including a central aperture through which the loading spout passes;

a first circular ring means, supported by the support frame, and located around the outside of the loading spout;

a second circular ring means journalled onto the first ring means;

at least one drive means constructed and arranged to rotate the second ring means in either direction of rotation about the first ring means;

a winch means carried by the outer ring including at least one monospiral drum;

a cable means carried by each monospiral drum attached at a first end to the monospiral drum and anchored at a second end to the loading spout; and a sheave means constructed and arranged to receive each cable means from each monospiral drum in a substantially horizontal direction and to transfer the received cable means to the loading spout in a substantially vertical direction.

2. A spout hoist according to claim 1 wherein the common axis of the first and second circular ring means is substantially concentric with the vertical axis of the loading spout.

3. A spout hoist according to claim 1 wherein the second ring means is outside the first ring means.

4. A spout hoist according to claim 3 wherein the second ring means is journalled onto the first ring means by means of a plurality of rollers occupying cooperating tracks in the first and second ring means.

5. A spout hoist according to claim 4 wherein the second ring means is journalled onto the first ring means by means of a plurality of rollers occupying a single pair of cooperating tracks in the first and second ring means.

6. A spout hoist according to claim 1 wherein each drive means to rotate the second ring means comprises a ring gear carried by the second ring means, and a motor drive means including a pinion engaged with the ring gear, a reduction gear box driving the pinion, and a motor driving the gear box.

7. A spout hoist according to claim 6 wherein the reduction gear box is a worm reduction gear box.

8. A spout hoist according to claim 6 wherein the ring gear forms part of the second ring means.

9. A spout hoist according to claim 6 wherein the ring gear is attached to the second ring means.

10. A spout hoist according to claim 1 including three drive means.

11. A spout hoist according to claim 1 including three drive means wherein each drive means to rotate the second ring means comprises a ring gear carried by the second ring means, and a motor drive means including a pinion engaged with the ring gear, a reduction gear box driving the pinion, and a motor driving the gear box.

12. A spout hoist according to claim 1 wherein the winch means includes three monospiral drums, each provided with separate cables which pass over separate sheaves, and wherein each cable is attached to the loading spout.

13. A spout hoist according to claim 12 wherein each cable is attached to the loading spout adjacent the exit end of the loading spout.

14. A spout hoist according to claim 12 wherein each cable passes about a pulley attached to the loading spout adjacent the exit end of the loading spout, and is anchored to the loading spout support frame adjacent the top of the loading spout.

15. A loading spout including a spout hoist according to claim 1 and further including at least two motorised pin mechanisms for attaching the loading spout to the support frame.

16. A loading spout according to claim 15 wherein each motorised pin mechanism comprises in combination:

a loading spout including a first chute section;

a mounting link including a first mounting pin hole extending upwardly from the first chute section;

a mounting box carried by the support frame, constructed and arranged to receive a mounting link carried by the first chute section;

at least one loading spout carrying link extending upwardly from within the mounting box, including within the mounting box a second mounting pin hole;

a pin means attached to the mounting box including a mounting pin constructed and arranged to fit within the first and second mounting pin holes, attached to a gear box and drive motor whereby the pin is driven into and out of engagement with the first and the second mounting pin holes.

17. A loading spout according to claim 16 wherein each motorised pin mechanism includes two spaced apart loading spout carrying links including second and third mounting pin holes disposed so that the mounting link enters between them, and the mounting pin fits within the first, second and third mounting pin holes.

18. A loading spout according to claim 16 wherein each motorised pin mechanism further includes a guide box attached to the mounting box constructed and arranged to guide the mounting link into the mounting box.

* * * * *